United States Patent Office 3,544,558
Patented Dec. 1, 1970

3,544,558
SUBSTITUTED DIAZOCINODIBENZOAZEPINES
Marshall D. Draper, Woodland Hills, Murle W. Klohs, Tarzana, and Francis J. Petracek, Agoura, Calif., assignors to Rexall Drug and Chemical Company, Los Angeles, Calif., a corporation of Delaware
No Drawing. Filed Jan. 22, 1968, Ser. No. 699,366
Int. Cl. C07d 53/00
U.S. Cl. 260—239
1 Claim

ABSTRACT OF THE DISCLOSURE

5 - lower alkyl - 4H - 5,6,7,8,14,15-hexahydro - 5,9 - diazocino[1,2,3-de]-dibenzoapines which are pharmacologically useful as antidepressants.

SPECIFICATION

This invention relates to compositions of matter classified in the art of chemistry as substituted diazocinodibenzoazepines.

The invention sought to be patented is described as residing in the concept of the chemical compound 5-methyl - 4H - 5,6,7,8,14,15 - hexahydro - 5,9 - diazocino [1,2,3-de]dibenzoazepine.

As used throughout the application the term "lower alkyl" embraces both straight and branched chain alkyl radicals containing from 1 to 6 carbon atoms, for example, but without limitation, methyl, ethyl, n-propyl, isoproply, n-butyl, tert-butyl, n-amyl, sec-amyl, n-hexyl, 2-ethylbutyl, 2,3-dimethylbutyl and the like.

The tangible embodiment of this invention possesses the inherent general physical characteristics of being, in the form of its acid-addition salts, solid crystalline materials. Spectral analysis, elemental analysis, and the aforementioned physical characteristics taken together with the nature of the starting materials and mode of synthesis, positively confirm the structure of the compound sought to be patented.

The tangible embodiment of this invention possesses the inherent applied use characteristics of having antidepressant activity without adverse toxicity as determined by recognized and accepted pharmacological test procedures hereinafter to be described. Specifically, the tests establish that the compound possesses antidepressant activity of the type possessed by the known antidepressant 5 - (3 - dimethylaminopropyl) - 10,11 - dihydro - 5H - dibenz[b,f]azepine (imipramine).

The manner and process of making and using the invention will now be generally described so as to enable one skilled in the art to make and use the same as follows:

Reaction sequence:

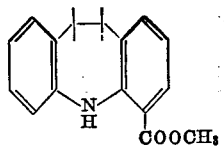

STARTING MATERIAL

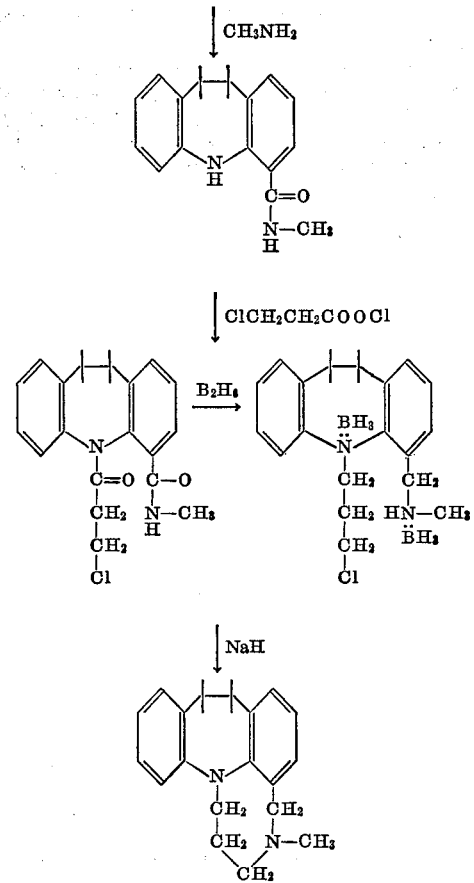

FINAL PRODUCT

The starting material according to the above depicted reaction sequence is the methyl ester of 10,11-dihydro-5H-dibenz[b,f]azepine-4-carboxylic acid which is readily prepared from 10,11-dihydro-5H-dibenz[b,f]azepine by carbonation of the lithium derivative to form 10,11-dihydro-5H-dibenzo[b,f]azepine-4-carboxylic acid followed by esterification through treatment with trimethylorthoformate. While, in the specific reaction sequence depicted above, the methyl ester is shown as the starting material, other lower alkyl esters are equally suitable as starting materials.

In carrying out the above-depicted reaction sequence, the 10,11 - dihydro - 5H-dibenz[b,f]azepine-4-carboxylic acid methyl ester is treated with methylamine in the presence of an inert solvent, such as isopropanol, under substantially anhydrous conditions at up to the reflux temperature of the solvent used to yield the 10,11-dihydro-5H - dibenz[b,f]azepine - 4 - (N-methyl-carboxamide) intermediate. The reaction is carried out in a bomb at up to 100° C.

The 10,11-dihydro-5H-dibenz[b,f]azepine-4-(N-methylcarboxamide) intermediate is then treated with β-chloropropionyl chloride in the presence of an inert solvent such as, for example, benzene at the reflux temperature of the solvent used to yield the 5-β-chloropropionyl-10,11-dihydro-5H-dibenz[b,f]azepine-4-(N-methylcarboxamide) intermediate which is then treated with diborane in the presence of an inert solvent such as, for example, tetrahydrofuran at its reflux temperature to yield a reduced 5-β-chloropropyl-4-(N-methylaminomethyl)-10,11-dihydro-5H-dibenz[b,f,]azepin diborane derivative which is in turn treated with sodium hydride to eliminate the diborane and effect cyclization of the intermediate to form the 5-methyl-4H-5,6,7,8,14,15-hexahydro-5,9-diazocino[1,2,3-de]dibenzoazepine final product.

Starting materials wherein the benzene rings of the 10,11-dihydro-5H-dibenz[b,f]azepine-4-carboxylic acid methyl ester bear one or more lower alkyl, lower alkoxy or trifluoromethyl groups are prepared by the same method as their unsubstituted counterpart and are the full equivalents of the specific starting material depicted above, their use resulting in similarly substituted final products. Such final products have the same utility as the specific final product depicted hereinabove and are included within the scope of this invention.

In carrying out the above-described reaction sequence chloroacetyl chloride may be substituted in the reaction sequence for the specific β-chloropropionyl chloride. Such substitution results in the preparation of corresponding 5-chloroacetyl-10-11-dihydro-5H-dibenz[b,f]azepin-4-(N-methylcarboxamide), 5-chloroethyl-4-(N-methylamino)-10,11-dihydro-5H-dibenz[b,f]azepine diborane and 5-chloroethyl-4-(N-methylamino)-10,11-dihydro-5H-dibenz[b,f]-azepine intermediates, and 5-methyl-4,5,6,7,13,14-hexahydro-5,8-diazepino[1,2,3-de]dibenzoazepine final product. Such final products are the full equivalents of and have the same utility as 5-methyl-4H-5,6,7,8,14,15-hexahydro-5,9-diazocino[1,2,3-de]-dibenzoazepine and are included within the scope of the present invention.

In carrying out the above-described reaction sequence to prepare the tangible embodiment of this invention or its above described equivalents, lower-alkylamines other methylamine can be used in the first step, thereby to prepare intermediates and final products having corresponding N-lower alkyl substitution, such final products being the full equivalents of and having the same utility as the specific final product depicted in the reaction sequence and being included within the scope of the present invention.

The tangible embodiment of this invention can, if desired, be converted into its nontoxic pharmaceutically acceptable acid-addition and quaternary ammonium salts. Salts which may be formed comprise, for example, salts with inorganic acids, such as the hydrochloride, hydrobromide, hydroiodide, sulfate, phosphate and the like. They may also comprise salts with organic acids, including monobasic acids such as the acetate or the propionate, and especially those with hydoxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl-bromide and the like. Such pharmaceutically useful acid-bromide and quaternary ammonium salts are the full equivalents of the base from which they are derived and are included within the scope of this invention.

The tangible embodiment of this invention, either as a free base or in the form of a nontoxic pharmaceutically acceptable acid-addition or quaternary ammonium salt, can be combined with conventional pharmaceutical diluents and carriers to form such dosage forms as tablets, suspensions, solutions, suppositories and the like.

The individual unit dosage and frequency of administration is determined not only by the nature and severity of the depression for which the subject seeks relief, but in addition upon age, weight, and species of subject, its underlying physical condition and the route of administration. It will, accordingly, be within the judgement and skill of the practitioner administering the drug to determine the exact amount to be administered so as to be nontoxic, yet pharmaceutically effective in alleviating the symptoms of depression.

The best mode contemplated by the inventors for carrying out the invention will now be set forth as follows:

EXAMPLE 1

(a) 10,11-dihydro-5H-dibenz[b,f]azepine-4-(N-methylcarboxamide)

10,11-dihydro-5H-dibenz[b,f]azepine-4-carboxylic acid 0.85 g. (0.003 mole) was suspended in 10 ml. isopropanol and excess methylamine allowed to boil off at room temat 100° C. for 24 hours. The bomb was cooled, opened and excess methylamine allowed to boil off at room temperature. The solvent was removed under reduced pressure and the residue (0.84 g.) crystallized from benzene. Yield: 0.53 g. (63.5%), M.P. after recrystallization from isopropanol, 163°–165° C.

Analysis.—Calc'd for $C_{16}H_{16}N_2O$ (percent): C, 76.16; H, 6.39; N, 11.10; O, 6.34. Found (percent): C, 76.05; H, 6.38; N, 11.10; O, 6.24.

(b) 5-β-chloropropionyl-10,11-dihydro-5H-dibenz[b,f]-azepine-4-(N-methylcarboxamide)

The product (0.845 g., 0.0033) from step "a" was dissolved in 20 ml. hot benzene and 2.2 g. (0.017 mole) β-chloropropionyl chloride added and the mixture refluxed for three hours. The mixture was cooled, partitioned between 50 ml. chloroform and 100 ml. 10% sodium carbonate solution and shaken vigorously. The organic separated and was washed with 1 N sodium hydroxide and dried over anhydrous magnesium sulfate. Removal of the solvent yielded 1.45 g. semisolid residue which was crystallized from benzene-ethanol. Yield: 0.81 g. (70%). M.P. 177–179.5° C.

Analysis.—Calc'd for $C_{19}H_{19}N_2O_2Cl$ (percent): C, 66.56; H, 5.59; N, 8.17; O, 9.33. Found (percent): C, 67.25; H, 5.98; N, 7.83; O, 9.12.

(c) 5-β-chloropropyl-4-(N-methylaminomethyl)-10,11-dihydro-5H-dibenz[b,f]azepine diborane The product (3.5 g., 0.01 mole) of step "b" was dissolved in 50 ml. tetrahydrofuran and added to 60 ml. 1.0 N diborane tetrahydrofuran solution. The mixture was refluxed for 72 hours, cooled and 60 ml. 2 N hydrochloric acid added dropwise. The solution was refluxed for one hour and the tetrahydrofuran removed under reduced pressure. The aqueous residue was made basic with 14% sodium hydroxide solution and extracted with chloroform. After drying the extracts over anhydrous magnesium sulfates removing the chloroform, a nearly colorless, somewhat oily solid was obtained. Yield: 3.01 g. (86.5%).

(d) 5-methyl-4H-5,6,7,8,14,15-hexahydro-5,9-diazocino [1,2,3-de]-dibenzazepine

The material obtained in the preceding step was suspended in 60 ml. diglyme and 3.0 g. 43% sodium hydride in mineral oil was added in portions and the mixture was stirred at room temperature for one hour. 60 ml. ice-cold water was added slowly, the mixture stirred for one-half hour and extracted with 2–50 ml. portions of ether. The combined ether extracts were washed with water, and extracted with 2–50 ml. portions of 1 H hydrochloric acid. The acid extracts were basified and again extracted with ether. Drying and removal of the ether yielded a pale yellow oil. Yield: 1.38 g. (57%).

The product was purified by recrystallization of the oxalate salt (M.P. 214.5–216° C.) from ethanol-water and conversion to the hydrochloride, M.P. 270–274° C. (dec.).

*Analysis.*—Calc'd for $C_{14}H_{22}N_2Cl$ (percent): C, 72.48; H, 7.36; N, 8.90; O, 11.26. Found (percent): C, 72.48; H, 7.36; N, 8.81; O, 11.26.

EXAMPLE 2

An acute toxicity determination was made of the compound prepared in Example 1 in accordance with standard pharmacological test procedures and revealed an $LD_{50}$ in mice by intraperitoneal administration of 94 mg./kg. The introperitoneal $LD_{50}$ of the comparison drug imipramine is 70 mg./kg. in mice.

The antidepressant activity of the compound was determined by measuring its norepinephrine potentiating activity in comparison with the known antidepressant agent imipramine. The activity of this established antidepressant agent is believed to reside in its ability to potentiate or increase the availability of norepinephrine in the brain (E. B. Sigg, Canad, Psych, Ass. J. 4:575(1959)). The same antidepressant agent has been shown to potentiate or increase norepinephrine activity in sympathetically innervated tissues, probably by blocking norepinephrine uptake (J. Axelrod et al., Science 133:383 (1961)).

The quantitative norepinephrine activity of the compound prepared in Example 1 was evaluated on isolated guinea pig atria according to the following procedure:

Guinea pigs were sacrificed and the heart was rapidly removed. The atria were dissected out and suspended in a jacketed organ bath maintained at 29° C. containing 20 ml. of McEwen's solution. The solution was aerated both in the bath and in the reservoir with a mixture of 95% $O_2$ and 5% $CO_2$.

Atrial contractions were measured by means of a strain gauge transducer. The output from the transducer was recorded on either an Offner Type 52 Dynograph Recorder or a Brush Mark 240 pen recorder. The contraction amplitude was measured from the chart paper in millimeters.

Contractions were recorded before the addition of the sympathomimetic drug to determine the resting amplitude of contraction, and for two minutes after the addition of the drug, at which time recording was discontinued and the drug was washed out. The maximum amplitude of contraction achieved while the drug was in the bath was designated as the drug response. Between drug additions, a fixed washing procedure was adopted such that the spontaneous contractions were returned to their resting level.

In each test, a dose of sympathomimetic amine (norepinephrine) was selected so as to give a submaximal response, and this dose was given until five consistent responses were obtained. A dose of $1.1 \times 10^{-7}$ moles of the test drug or imipramine standard was then injected into the bath after the completion of the normal washing sequence and left in contact with the atria for two minutes. The standard dose of amine (norepinephrine) was then added, and contractions recorded for a further two minutes. This procedure was repeated until five responses to the sympathomimetic amine in the presence of the test drug or imipramine standard had been obtained. The normal washing procedure was adhered to throughout.

The mean control response was compared with the mean response obtained in the presence of the antagonist compound. The statistical significance of the difference between the means was tested by means of the student's "t" test. Thus a separate result was obtained for each test.

In the case of quantitative studies, responses were measured as the difference between "resting amplitude of contraction" and "response height." Response was plotted against a variable which was linearly related to log dose.

In each test, a norepinephrine dose-response curve was obtained. Three or four doses were selected from the linear portion of the curve and repeated so that either two or three responses were obtained at each dose level.

The dose-response curve was then repeated with doses of $1.1 \times 10^{-7}$ moles of the compound being tested preceding the doses of norepinephrine. Again, three doses were selected from the linear portion of the curve and either two or three responses were obtained at each dose level.

Regression lines were fitted to the points thus obtained by the method of least squares.

For ease of calculation of the regression equations, the responses to norepinephrine were plotted against a variable which was linearly related to the logarithm of the dose injected and also to the logarithm of the bath concentration, as the dilution factor remained constant. The regression equations thus obtained were checked statistically for inearity, parallelism and coincidence before proceeding with the calculation of potency ratios.

The horizontal distance between the lines with the 95% confidence limits was calculated. This represented the ratio of the potency of norepinephrine in the absence and in the presence of the compound.

Using a final bath concentration of $5.5 \times 10^{-6}$ m. for the compound tested and the imipramine standard, the following results were obtained:

| Compound: | Norepinephrine potentiation (potency ratio) |
|---|---|
| Imipramine | 14.5 |
| Compound from Example 1 | 6.9 |

Thus, the compound of this invention has marked ability to potentiate norepinephrine in this test.

Since a side effect attributable to established antidepressant agents relates to anticholinergic activity a determination was made in the guinea pig ileum measuring the anti-muscarinic activity of each of the compounds tested. The method used was as follows:

Antimuscarinic activity was measured by the $pA_2$ method described by H. O. Schild, British J. Pharmacol. 2:189 (1947). A strip of ileum 2.5–3.0 cms. in length was set up in a 12 ml. overflow jacketed organ bath maintained at 32° C. and supplied with a mixture of 95% $O_2$ and 5% $CO_2$. The tissue was bathed with Tyrode solution. Contractions were measured with an isotonic semiconductor strain gauge transducer. A static load of 1 gm. tension was placed on the tissue so as to reduce spontaneous contractions. The output of the transducer was fed via a balancing bridge to a Bausch and Lomb VOM 7 potentiometric recorder.

Acetylcholine (ACh) doses were added to the ileum every 3 mins. The bath was washed out after the maximal response was achieved. A constant response was obtained to a submaximal dose of acetylcholine ($1 \times 10^{-7}$ to $1 \times 10^{-8}$ gm./12 ml. bath). The antagonist drug was given 2 mins. before a double dose of ACh. Three doses of the antagonist drug were chosen such that the middle dose reduced the response to a double dose of ACh to roughly that of a single dose; and the higher and lower dose of antagonist reduced the response to a double dose of ACh to respectively less than and more than the single dose response. Doses of the antagonist were given a Latin square sequence. A constant response was obtained to a single dose of ACh between each dose of antagonist.

The results were summarized for each antagonist as a regression equation and the corresponding $pA_2$ value, where $(pA_2) = -\log(A)$, $(A)$ being the molar antagonist concentration that will reduce the response of a double dose of ACh to that of a single dose in the absence of antagonist. The results reveal that the compound of Example 1, 5-methyl-4H-5,6,7,8,14,15-hexahydro-5,9-diazocino[1,2,3-de]dibenzazepine is 1/30 as potent in anticholinergic properties as imipramine. Since imipramine is only 2.1 times more active than the compound of Example 1 in norepinephrine potentiation (thus, antidepressant activity), with 30 times the anticholinergic side effect, the compound of this invention is shown to possess a more favorable potential for safe antidepressant activity than the known antidepressant imipramine.

The subject matter which the applicants regard as their invention is particularly pointed out and distinctly claimed as follows:

1. 5 - methyl - 4H-5,6,7,8,14,15-hexahydro-5,9-diazocino[1,2,3-de]dibenzazapine.

References Cited

UNITED STATES PATENTS 3,052,689   9/1962   Schindler _____ 260—239

ALTON D. ROLLINS, Primary Examiner

U.S. Cl. X.R.

424—244

PO-1050
(5/69)

UNITED STATES PATENT OFFICE
CERTIFICATE OF CORRECTION

Patent No. 3,544,558          Dated December 1, 1970

Inventor(s) MARSHALL D. DRAPER, MURLE W. KLOHS and FRANCIS J. PETR

It is certified that error appears in the above-identified patent and that said Letters Patent are hereby corrected as shown below:

In the specification:

Column 3, lines 44 and 45: "lower alkylamines oth methylamine" should read "lower alkylami other than methylamine"

Column 3, line 69: "useful acid-bromide" should read "useful acid-addition"

Column 4, lines 21 to 23: "0.85 g. (0.003 mole) was suspended in 10 ml. isopropanol and excess methylamine allowed to boil off at room tem- at 100°C for 24 hours". should read "0.85 g. (0.003 mole) was suspended in 10 ml. isopropanol and 6 ml. anhydrous methylamine and heated in bomb at 100°C for 24 hours".

Signed and sealed this 15th day of June 1971.

(SEAL)
Attest:

EDWARD M. FLETCHER, JR.
Attesting Officer

WILLIAM E. SCHUYLER, JR
Commissioner of Patents